April 28, 1970   L. O. SQUINTO ET AL   3,508,531
ARRANGEMENT OF CYLINDER AND PISTON IN ENGINE
Filed May 31, 1968   2 Sheets-Sheet 1
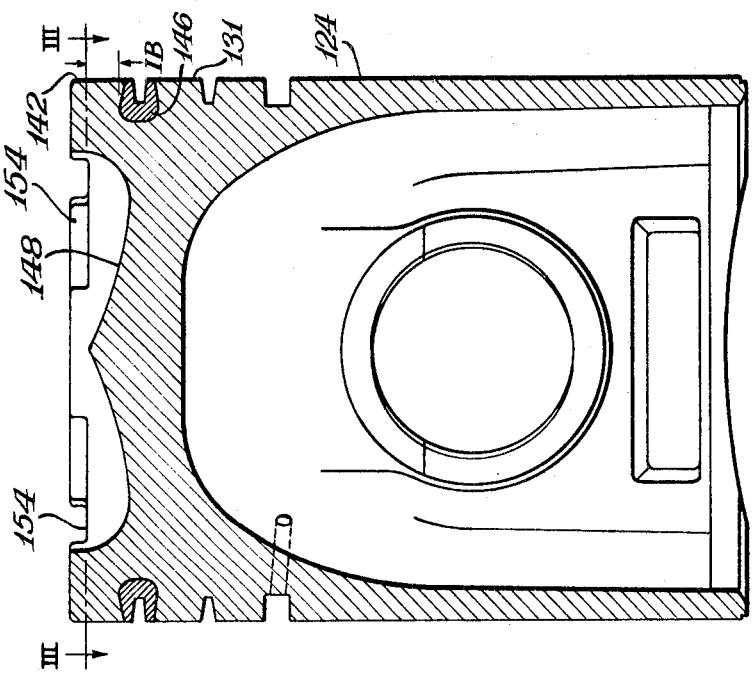
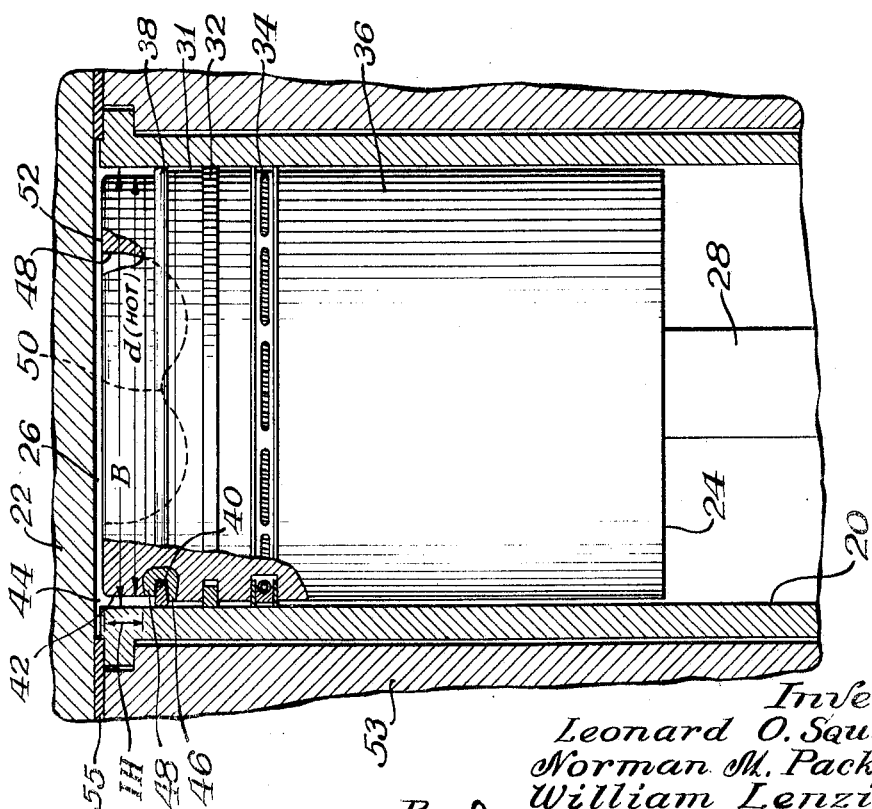
Inventors:
Leonard O. Squinto
Norman M. Packard
William Lenzi
By John W. Isaires Atty.

United States Patent Office 3,508,531
Patented Apr. 28, 1970

3,508,531
ARRANGEMENT OF CYLINDER AND PISTON IN ENGINE
Leonard O. Squinto, Berwyn, Norman M. Packard, Des Plaines, and William Lenzi, Western Springs, Ill., assignors to International Harvester Company, Chicago, Ill., a corporation of Delaware
Continuation-in-part of application Ser. No. 625,352, Mar. 23, 1967. This application May 31, 1968, Ser. No. 735,498
Int. Cl. F02f 5/00; F16j 9/12
U.S. Cl. 123—193  15 Claims

ABSTRACT OF THE DISCLOSURE

Internal combustion engine piston formed with a large radial setback of the top land to provide exaggerated piston clearance about the head of the piston, and formed with a longitudinally very short top land to provide minimal total clearance volume. Such setback creates an oversize but longitudinally short annular orifice, leading to the top seal ring on the piston and insuring maintenance of a wide orifice path through which high carbon burning temperatures and turbulence can be communicated and high combustion pressures can be communicated from the zone where the fuel is being ignited. The pressures are conducive to high gas loading pressure on the top ring, the temperatures and turbulence are conducive to minimal deposits of adherent load bearing carbon on the piston, and the shallowness of the orifice is conducive to keeping the end clearance volume largely confined to the combustion dish in the piston.

---

This application is a continuation-in-part of our co-pending application Ser. No. 625,352 filed on or about Mar. 23, 1967 now Patent No. 3,463,057, the disclosure of which is incorporated in entirety herein by reference.

Our invention relates to the combustion chamber of an internal combustion engine. It particularly relates to a piston and a receiving cylinder defining such chamber, in which the setback of the piston top land, also known as the head land, and the top land length cause the land to be sufficiently far away from the cylinder wall and sufficiently short that a large shallow clearance orifice results leading directly to the top one of the seal rings provided on the piston.

According to practice in the past, the volume of the annular space between the receiving cylinder and the confronting cylindrical portion of the top of the piston has been designed to be very thin. The result in the general engine is the restriction, to a minimum, of the room for entry of carbon deposits on the generally cylindrical top land around the piston. A second result, especially significant in the diesel engine, is the reduction of the volume of unusable combustion space outside of the direct range of the injection spray. Therefore, it has been the practice to make provision that the hot, running fit is a close fit between the piston and the cylinder bore, particularly in the vicinity of the cylindrical top land surface of the piston. Closer and closer fits have gradually become possible because manufacturing techniques and tolerances have continued to improve and, with such improvement, the design tendency is moreso and moreso to seek the closest fits possible.

Yet it has been discovered that, while the minimizing of the piston head-cylinder wall clearance to the extent possible by modern manufacturing techniques does in fact prevent the loss of usable end clearance volume in the combustion space, it seems to accentuate the difficulty of carbon deposits so that adherent, unburned, load bearing carbon is formed and is deposited around the piston head. Load bearing carbon acts like emery on the confronting cylinder wall.

Our invention materially reduces or substantially eliminates both the carbon deposit problem and the loss of effective volume problem, as will now be explained in detail. Features, objects, and advantages will either be specifically pointed out or become apparent when, for a better understanding of the invention, reference is made to the following description taken in conjunction with the accompanying drawings, which show a preferred embodiment thereof and in which:

FIGURE 1 is a longitudinal, sectional, elevational showing through an operating engine cylinder, viewed from the left side of an engine embodying the present invention;

FIGURE 2 is similar to FIGURE 1, except FIGURE 2 is seen as it would be viewed from the front of an engine and shows a piston alone which is illustrative of a modified form of the invention;

Figure 3:
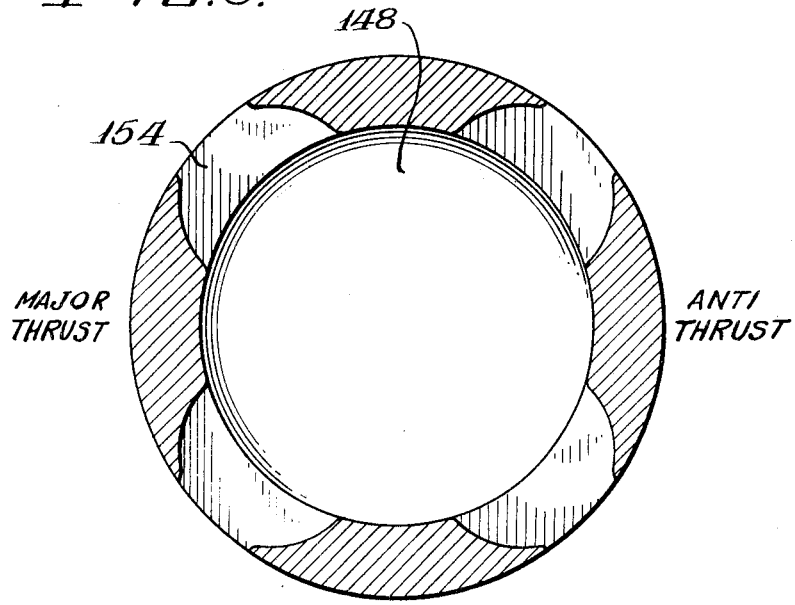
FIGURE 3 is a top plan view of the modification shown in FIGURE 2.
Figure 4:
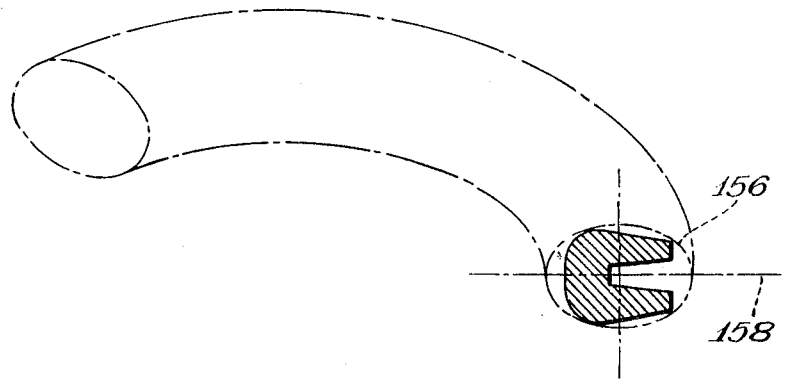
FIGURE 4 is similar to FIGURE 2, but shows a detail alone in isometric view.

More particularly in FIGURE 1 of the drawings, an exemplary cylinder 20, more specifically, a cylinder sleeve, is illustrated in a diesel engine. A head 22 at the outer end of the cylinder and a piston 24 slidably mounted in the cylinder mutually define with the cylinder a combustion chamber 26. A connecting rod 28 connects a piston wrist pin, not shown, in the usual way to an engine crankshaft, not shown.

In a ring belt portion 31 thereof, the piston 24 carries a second compression ring 32 and an oil control ring 34 in conventional way.

The portion of the piston 24 below the oil control ring 34 of the ring belt portion 31 consists of a skirt 36 effecting the customary guiding fit with the wall of the cylinder 20. The nominal cylinder bore is indicated at B, FIGURE 1.

In the immediate vicinity of, and particularly above, a top, keystone-shaped compression seal ring 38 which is provided, and a top, keystone-shaped groove 40 which is defined by means in the piston and which receives the top ring, the portions of the piston are materially set back or cut back forming a setback top land 42 having a diameter of the measurement indicated at $d$ when the piston 24 is hot. When cold, the top land diameter of the piston is referred to hereinafter as D (cold), not shown. An annular gas orifice 44 thus results between the top land 42 and the confronting wall of the cylinder 20, and between the top ring 38 and the top of the top land where the latter intersects the head of the piston.

The piston 24 illustrated is a so-called aluminum piston, i.e., the material is an aluminum alloy such as Y-alloy characterized by the desired property of lightness but also having the property of comparatively low impact resistance at elevated temperature, for example, at a regular engine operating temperature of approximately 500° F. So to avoid having the ring groove enlarge in service due to hammering of the sides of the groove by the top compression ring, the referred to means defining the top ring groove 40 comprises insert 46 made of an impact resistant material compatible to the aluminum of the piston in regard to the coefficient of thermal expansion and other properties. One insert material very satisfactorily employed in aluminum pistons is known as Ni-Resist cast iron, and the insert is made in the customary small size whereby the so-called aluminum piston is in fact predominantly aluminum.

The insert 46 hereof does not occupy the usual location on the piston but instead is positioned so that the top land 42, in terms of the longitudinal extent of the piston, is extremely short and the top ring 38 occupies what may be termed a raised top ring position on the combustion chamber end of the piston. The insert bridges between and forms a part of each of the belt 31 and land 42.

The distance from the insert 46 to the top of the head at the closest point between the two has an insert-to-head value IH approximately in the range between 0.375" and 0.5", and preferably being about 0.375".

The piston 24 is a typical diesel piston, the type as actually shown having no provision for a valve cut-out or valve cut-outs, and incorporating a so-called Mexican hat design. In other words, a deep combustion dish 48 is formed slightly eccentrically or else concentrically to the head, having a central upstanding cone tip 50 and being surrounded by an annular crown 52. The resulting dish 48 forms a depression in the head which is subjected to combustion gas pressures during burning of the injected fuel spray in the combustion chamber 26. The injector, air and exhaust ports, and valves provided in the head are conventional and, for simplicity's sake, are omitted from the showing.

The cylinder sleeve or cylinder 20 is of the dry type as illustrated, tightly fitting within the crankcase 53 of a diesel engine. A customary head gasket 55 is clamped by, and forms a seal between, the cylinder head 22 at one side and the cylinder sleeve 20 and crackcase 53 at the other side of the gasket.

SEALING OPERATION—FIGURE 1

At the illustrated transition point between the two strokes, and both during the last part of the compression stroke and during the first part of the firing stroke, the head of the piston 24 is subjected to the force of the explosion, and the firing gas pressure is communicated freely down the orifice 44 which is ring shaped, being relatively thick radialwise and shallow lengthwise as viewed in cross section. The guiding effect of the piston skirt centers and maintains the orifice 44 substantially uniform in its radial thickness dimension, although the size is large enough that the orifice does not appreciably pinch down due to any reasonably anticipated lateral shift or rocking of the piston 24.

The column of downwardly expanding gas is axially blocked by the top ring 38 and the pressure is diverted so that there is a buildup along the upper sidewall and in the bottom of the ring groove 40. A gas loading effect results, the pneumatic force pressing downwardly and pressing radially outwardly from the groove bottom against the ring 38 to hold it tightly in contact with the wall of the cylinder 20.

It has been observed that, at a temperature which is estimated to be between about 600° and 700° F., the combustion gas deposits out at least some carbon in a lacquer-like phase containing a binder which enables the carbon to adhere both to itself and to the top land 42. The binder prevents the carbon from sloughing away and imparts a cohesive property whereby the collecting phases of carbon take on an identity as the so-called load bearing, top land carbon.

In contrast to the present gas orifice which is not deep and which is not thin at one or the other side of the piston illustrated, a uniformly thin and deep orifice about the head or a deep orifice, which because of shifting becomes thin at one or more points, establishes a constricted isolated volume at the head tending to operate at no higher than the stated estimated 600° and 700° F. temperatures and being conducive to the formation and accumulation of a thickening deposit of the load bearing carbon about the top end of the piston.

It has also been observed, in rather striking fashion, that an exaggeratedly radially oversize orifice which is shallow as indicated herein at 44 minimizes or eliminates the problem caused by the burning gas depositing out load bearing carbon, apparently for the reason that the temperature and turbulence within the orifice 44 are sufficiently high and the quench area is sufficiently low that the binder phase of a carbon decomposes and is blown away or is burned without a chance to produce cohesive buildup of top land carbon.

MODIFICATION—FIGURES 2 AND 3

In case a piston is provided with valve cutouts in the piston head to prevent interference with the engine valves, our invention can be applied to much the same advantage in that case except that the top land and the gas orifice become proportionally longer and deeper, respectively, in terms of the longitudinal extent of the piston.

Thus by way of the example of the modification as shown in FIGURES 2 and 3, the head of the piston 124 illustrated is depressed in four places with valve cutouts 154 commonly intersecting the combustion dish 148 and forming a ring of cutouts thereabout. The head or combustion chamber end incorporates the conventional Mexican hat design, already described, and except where noted to the contrary the balance of the piston is conventional and in the interests of brevity will not be individually described.

An insert 146 defining the top ring groove and bridging between a ring belt 131 therebelow and a top land 142 thereabove is positioned so that the distance between the insert 146 and the nearest point on the bottom of the deepest cutout 154 has an insert-to-bottom value IB approximately in the range from 0.375" to 0.5", and preferably being about 0.375".

CASTING DETAILS—TYPICAL PISTON

The resulting raised top ring positions of the pistons of the preceding embodiments of the invention are controlled by the location of the inserts defining the top ring grooves. The location is an optimal compromise such that sufficient aluminum metal above the inserts prevents the inserts from tearing out of the pistons and at the same time, in terms of the longitudinal extent of each piston, the depth of the gas orifice about the head of the piston and the length of the top land are kept at a minimum measurement.

The aluminum metal forms the body of the piston, including its combustion chamber end portion, ring belt portion, and skirt portion, and is in-cast within and about the insert to bond to it and lock the insert in place. Customary techniques are employed, well known from the references cited against, and from the disclosures of, U.S. Patents No. 2,396,730, No. 2,550,879, and No. 3,183,796.

INSERT—FIGURE 4

The piston insert in to which the aluminum body is in-cast is made as a pre-formed ring-carried torus. It has a low torus height, and, as viewed in cross section, conforms generally to the outlines of a somewhat flattened reference ellipse 156 in which the major axis 158 is in the plane of the torus.

Several of the surfaces of the torus are not rounded and actually form chords of the illipse. The ring groove therein is re-entrant angled to the outermost chord to form a so-called center V-groove, and the plane of the floatingly received top ring therein and the midplane of the torus and the groove formed therein substantially coincide.

CROSS SECTION—TYPICAL GAS ORIFICE

The objective of locating the piston insert with sufficient aluminum material, but no more than enough aluminum material, between it and the head of the piston to prevent the insert from carrying out of the head, coupled with the further objective of making the gas orifice wide for the effects desired herein, results in a rather squat gas orifice as viewed in cross section compared to the results of conventional top land dimensioning practices.

In the example of a piston which is arranged with valve cutouts in the head end of the piston (as shown in FIGURE 2) and with the insert being spaced apart by a distance of 0.6" from the floor of the deepest cutout at the point at which the two are closest together, the minimum diametrical clearance of the top land (HOT) affords an average radial clearance of 0.020" (HOT). So the average height to width ratio of that example of an orifice in cross section is 30:1.

The minimum height to width ratio preferred is about 9:1. Thus, in the example of a piston in which the gas orifice is 0.375" deep between the top ring and the top of the top land and has a diametrical width of 0.080" (HOT), or 0.040" (HOT) radially between the top land and the wall of the cylinder in average value about the piston, the height to width ratio of the cross section on the average is 9.4:1.

LIVE TENSION—TYPICAL TOP RING

The preferable top ring is a split ring made of cast iron alloy, and has a keystone shape in the example illustrated. The ring has an inherent tension when forcibly closed to bore size, a tension reading of an appropriate figure being in the range of from 5 to 20 pounds, preferably being about 11 pounds for use in the present examples of the piston described.

In other words, the top ring does not constitute a so-called dead ring, wherein the relaxed diameter would be approximately bore diameter and the inherent tension of such dead ring when closed to bore size would amount to between 0 and 1 pound, for example. The top ring and groove are mutually coextensive with one another in terms of the longitudinal extent of the piston, the tension urging the ring away from the bottom of the groove.

The gas pressure in the space between the bottom of the groove and the ring appreciably increases the sealing force between the outwardly pressing ring and the confronting cylinder wall. At most, the gas loading never exceeds about 90% of the complete sealing pressure and, under all circumstances, at least about 10% of the force is solely mechanical due to the inherent spring tension of the top ring.

BENEFITS

The effective top ring sealing afforded in the foregoing manner gives direct benefits by way of reduction of blow-by, reduction of top ring stickage, reduction of second ring stickage, and reduction of lubricating oil contamination and lubricating oil consumption because of better oil control. Hence, lubricating oils can successfully be used having comparatively low amounts of additives, in view of the fact that better sealing of the top ring reduces the oxidation and contamination of the oil by lowering the thickness of the oil film deposited on the wall and by reducing its residence time in the ring belt.

The load bearing carbon elimination brought about both by the more efficient combustion and by the shallow but wide gas orifice results, in the desired way, in reduction of the wiping off of the hone pattern on the cylinder wall and in the reduction of top ring wear. Ring wear tends to be reduced whenever the hone pattern is sufficient to maintain the lubricating oil film which is necessary on the cylinder wall to lubricate the rings. With no load bearing top ring carbon present, there is no abrasive present to polish the cylinder bore smooth and so cylinder burnishing and loss of the hone pattern do not occur.

The pistons of the preceding embodiments each necessarily have a major thrust side and an anti-thrust side as illustrated in FIGURE 3, but may or may not have the valve cutouts there illustrated, depending upon the engine. The valve cutouts 154 so illustrated are of the same depth, but the controlling factor with valve cutouts herein is that the minimum distance between the insert and the cutout is necessarily measured between the insert and the bottom of the deepest cutout.

The piston illustrated in the showing of FIGURE 1 is a 4½" diesel piston for use in a V-8 direct injection diesel engine. The piston as shown in FIGURE 2 is used in a diesel engine of nominal cylinder bore diameter of 5.375" to 5.376".

DIMENSION DETAILS—TYPICAL PISTON

A typical piston is a 4½" piston for diesel purposes having valve cutouts in the head of the piston and a combustion dish in the head. The skirt has the usual formation of slight ellipticalness of cross section so that, when cold, the outside diameter between the major thrust and anti-thrust sides slightly exceeds the outside diameter at the pin bosses, i.e., taken across the portion of the skirt adjacentt the outer ends of the wrist pin. The difference between the diameters of one physicaly constructed embodiment at right angles to one another was in the range between 0.004" and 0.0012", e.g., a 0.007" cam difference.

Irrespective of the cross sectional shape of the top land, at least that particular diametrical measurement thereof which is between the thrust and anti-thrust sides has a comparatively small top land diameter D (cold) prevailing substantially uniformly from top to bottom of the top land. Although the land can be of non-circular shape, e.g., elliptical wherein the measurement D (cold) is made along the minor axis, the top land in a piston as actually physically embodied was ground so as to have a purely cylindrical shape, with constant diameter (cold) around, and with constant diameter (cold) from top to bottom of the top land.

The typical piston immediately in question, in one physically constructed embodiment of the invention, was formed so that D (cold) was exceeded by the nominal 4½" bore B (FIGURE 1) of the receiving cylinder by a total clearance representing the sum of two clearance parameters or values. One of the constituent values was the conventional product 0.0045" B which is the so-called expansion clearance (cold) that takes warm-up into account. Allowing for expansion enables the aluminum piston to expand when heated without interference with or scraping against the cylinder wall which, being cast iron, has a lower coefficient of expansion and is not so heat sensitive. By way of obtaining the total clearance, we added to that one value a larger, gas loading clearance value which was a minimum of 0.060" and certainly no less than approximately 0.040". The consequent radial and downward gas force through the resulting clearance insured good ring sealing.

The preferred range of the gas loading clearance parameter or value in the total clearance was about 0.060" to 0.080", and it will be seen hereinafter that 0.061" has, for example, been successfully employed. A gas loading clearance value, in the total clearance, larger than 0.100" is not only unnecessary but is undesirable in most cases because the excessive resulting total annular clearance appreciably reduces the effective combustion volume in the combustion dish. More generally, the foregoing procedure for calculating piston dimensions can be applied to equal advantage with aluminum diesel pistons having bores approximately in the range between the nominal 3" size and 9" size.

In the case of the specific physically constructed embodiment referred to, the cast iron cylinder liners of the engine had a nominal cylinder bore of 4½" which, under present manufacturing practices, amounted to a cylinder diameter of approximately 4.501" (cold) and 4.503" (HOT). The top land diameter D (cold) was equal to the cold bore diameter less the total clearance, which clearance equalled the sum of 0.020" plus 0.061". In that specific case, the measurement D (cold) was therefore the difference between 4.501" and 0.081" or about 4.420" in diameter.

ENGINE OPERATION

In the engine operation, and occurring simultaneously with the sealing operation already described, there is a short critical period (e.g., limited to about 22° crankshaft rotation) of injection, combustion, and attainment of combustion pressure all while the piston is at or near top dead center prior to performing the main part of the expansion stroke. During that period with the present arrangement, the available piston end clearance volume provides practically entirely usable combustion space, i.e., it tends to confine itself to the dish wholly in the injection spray range and the injected fuel properly mixes with all of the air for efficient combustion.

The present piston construction with a short, setback top land, meets two desiderata already indicated. The exaggerated width of the annular orifice about the piston head insures communication without appreciable loss of turbulence and combustion pressure to the top, gas loaded ring and the shallowness of the orifice, with or without the width just referred to, insures the desired high combustion temperature in the orifice and concentration of the usable space within the direct injection spray range to the immediate area of the combustion dish.

We have found that raising the top ring position on a piston means that the rest of the rings on the piston therewith, i.e., the entire ring belt, can be raised on the head of the piston toward the combustion chamber end thereof, selectively enabling either the piston overall length to be shortened, or else the effective skirt length to become proportionally longer if the same overall length of piston is desired to be retained. In the latter eventuality, the proportionally longer skirt length affords better motion control over the piston.

It is understood that the principles of the invention apply with equal advantage to top rings of various widths and cross sectional shapes which can be selected from, the ring groove in the inert being conformed in each case so as to be complementary to the top ring shape selected.

Variations within the spirit and scope of the invention described are equally comprehended by the foregoing description.

What is claimed is:

1. Piston and cylinder of an engine of nominal bore B, said piston having a ring belt portion and a skirt dependent therefrom; means defining ring grooves carrying piston rings therein, including a cast-in insert defining a top ring groove carrying a top seal ring; lands alternating with the grooves and including a top land having a location immediately above the top ring; said insert bridging between and forming part of each of the respective top land and ring belt portion; said top land having at least that diametrical measurement thereof which is between the thrust and anti-thrust sides to have a relatively small top land diameter D which is substantially uniform from top to bottom of the top land, said piston and cylinder characterized by the improvement of:

B exceeding D (cold) by about 0.0045" B expansion clearance plus a gas loading clearance which is at least approximately 0.040";

the piston material being primarily aluminum or an alloy thereof;

the spacing of said insert relative to the top of the head or to the floor of the nearest valve cutout provided, if any, being such that the distance between the two at the point where they are closest together is approximately in the range between 0.375" and 0.05".

2. The invention of claim 1, characterized by the top land (cold) having a substantially constant diameter throughout 360° uniformly from top to bottom thereof.

3. The invention of claim 2, characterized by the material of the insert in the piston having materially higher impact resistance at high temperature than the material of the piston.

4. The invention of claim 3, the piston characterized by being a diesel engine piston.

5. The invention of claim 4, further characterized by: said distance being about 0.375";

the average radial thickness dimension (cold) of the resulting shallow, generally annular gas orifice between the top land and the confronting wall of the cylinder and between the top ring and the top of the top land being approximately half the sum of the product of 0.0045" B plus a gas path clearance in the range between 0.060" and 0.080", whereby a shallow, substantially wide gas orifice is present around the piston to insure communication of firing pressure to the top ring when the parts expand and operate under the loaded running temperatures of the engine.

6. The invention of claim 5, characterized by the top ring and top ring groove being substantially mutually coextensive with one another along the length of the piston whereby the plane of the ring and the plane of the groove substantially coincide.

7. The invention of claim 6, characterized by the radially outwardly exerted sealing force of the top ring due to inherent spring tension in the ring material contributing at least 10% to the total sealing force exerted between the top ring and the confronting wall of the cylinder under all engine operating conditions.

8. The invention of claim 7, characterized by the material of the insert being a high nickel, cast iron alloy and the top ring material being a cast iron alloy.

9. In an internal combustion engine:

a cylinder having a bore;

a piston therein, working in the bore and having its combustion chamber end formed uniformly with a reduced diameter from the rest of said piston, said piston provided with a ring belt having piston rings carried in grooves in the ring belt, said end of the piston with reduced diameter extending the full distance between said combustion chamber end of said piston and the one of said ring grooves closest thereto, and intersecting the wall of said one ring groove closest to said combustion chamber end of said piston; and a ring-carrier torus in the piston defining said one ring groove, the distance between those points on the respective combustion chamber end surfaces and the torus which are closest together being approximately in the range between 0.375" and 0.5", said torus being made of a material more resistant to impact than the piston material, and bridging between and forming a part of each of the respective top land and ring belt of the piston.

10. In a diesel engine, the combination of:

a cylinder;

a piston therein having a ring belt portion and a skirt dependent therefrom, a series of piston rings carried in ring grooves formed in said ring belt portion, a top land having an external diameter less than that of said ring belt portion and extending axially from the one of said grooves farthest from said skirt to the combustion chamber end of said piston remote from said skirt; and a piston insert defining said one groove, the distance between the insert and the nearest surface on the combustion chamber end of said piston at the point where the two are closest together being approximately in the range between 0.375" and 0.5".

11. The invention of claim 10, characterized by said cylinder having a nominal bore diameter approximately in the range between 3" and 9".

12. The invention of claim 11, characterized by said one groove and the ring carried therein being mutually coextensive with one another lengthwise of the piston and positionally related to the insert whereby the plane of the ring and the groove and the midplane of the insert substantially coincide.

13. The invention of claim 11, the shallow, generally annular gas orifice between the top land and the wall of the cylinder and between the top ring and the top of the top land characterized by an average cross sectional area of which the height to width ratio is no more than approximately 30:1.

14. The invention of claim 13, said cross sectional area characterized by an average height to width ratio approximately in the range between 9:1 and 30:1.

15. A diesel piston with a body having a combustion chamber end and comprising:
  a light metal alloy casting;
  a hard metal ring-carrier torus having a center groove to floatingly receive therein the top sealing ring of the piston, said sealing ring being coextensive with the center groove in said torus longitudinally of said piston so that the plane of the ring and the midplane of the groove substantially coincide, said torus substantially conforming to an ellipse, as viewed in cross section, and having its major axis in the plane of the torus so that the latter has a relatively low torus height;
  said casting forming the body of said piston including the combustion chamber end thereof, and being incast about said ring-carrier torus;
  said combustion chamber end being relieved whereby at least two combustion chamber end surfaces are presented by the piston having relative longitudinal offset therebetween;
  said ring-carrier torus being so intermediately located on the incast piston body mutually spaced apart from both ends thereof, that the distance between the torus and the closest point on the nearest combustion chamber end surface is approximately in the range between 0.375" and 0.5".

References Cited

UNITED STATES PATENTS

| | | | |
|---|---|---|---|
| 1,492,397 | 4/1924 | Roberts | 92—208 XR |
| 2,845,917 | 8/1958 | Laubender. | |
| 2,971,802 | 2/1961 | Kennemer et al. | 92—208 XR |

FOREIGN PATENTS

| | |
|---|---|
| 721,889 | Germany. |
| 930,903 | Germany. |
| 519,886 | Italy. |

OTHER REFERENCES

The Design of High Speed Diesel Engines, M. H. Howarth, American Elsevier Pub. Co., Inc., 1966, p. 189.

WENDELL E. BURNS, Primary Examiner

U.S. Cl. X.R.

92—175, 208